United States Patent
Kuo et al.

(10) Patent No.: US 6,299,823 B1
(45) Date of Patent: Oct. 9, 2001

(54) METHOD FOR MANUFACTURING ROLLER CARRIER OF VIBRATION BALANCE DEVICE

(75) Inventors: Lih-Hwa Kuo; Ta-Hsiang Wang; Cheng-Yao Liao, all of Taipei (TW)

(73) Assignee: Lite-On It Corporation, Taipei (TW)

( * ) Notice: Subject to any disclaimer, the term of this patent is extended or adjusted under 35 U.S.C. 154(b) by 0 days.

(21) Appl. No.: 09/542,833

(22) Filed: Apr. 4, 2000

(51) Int. Cl.$^7$ ..................................................... B29C 45/00
(52) U.S. Cl. ........................... 264/645; 264/655; 264/657; 264/666; 264/670
(58) Field of Search ................................... 264/645, 655, 264/657, 666, 670

(56) References Cited

U.S. PATENT DOCUMENTS 5,989,144 * 11/1999 Chen et al. ........................... 475/168
6,012,538 * 1/2000 Sonobe et al. ........................ 180/220

* cited by examiner

Primary Examiner—Daniel J. Jenkins

(74) Attorney, Agent, or Firm—Rosenberg, Klein & Lee

(57) ABSTRACT

A method for manufacturing the roller carrier of a vibration balance device, the roller carrier is installed with at least one round track around a rotary axis thereof for carrying a plurality of rollers; characterized in that: the roller carrier is made of ceramic powder and made by a process of ceramic powder metallurgy. The material of the powder is A92A aluminum oxide or zirconium oxide, or other proper metal oxide. The manufacturing process of the ceramic powder metallurgy includes the steps of: feeding material, compacting, sintering, and polishing, or other manufacturing process of the ceramic powder metallurgy can be used, which includes the steps of feeding material, pelletizing, injection molding, debinding, sintering, and polishing. The roller carrier from aforementioned processes uses less materials, can be mass-produced, has a precise dimension, is light weighted, has a smooth surface and has a high surface hardness. In other word, the roller carrier made from the manufacturing process of ceramic powder metallurgy not only has preferred physical properties, such as good hardness, smoothness and precision, but also can reduce the vibration from the eccentricity of rotation and prolong the lifetime. Moreover, the manufacturing cost can be reduced greatly and yield is increased. Therefore, the present invention is economical.

10 Claims, 2 Drawing Sheets

METHOD FOR MANUFACTURING ROLLER CARRIER OF VIBRATION BALANCE DEVICE

FIELD OF THE INVENTION

The present invention relates to a method for manufacturing the roller carrier, and especially to a method for manufacturing the roller carrier of a vibration balance device, which can reduce all the vibration from the a eccentricity in rotation so as to maintain at a balance condition, in the method, a manufacturing process of ceramic powder metallurgy is used to manufacture the roller carrier.

BACKGROUND OF THE INVENTION

In the rotation device with high rotary speed, since the center of gravity is uneasily to be controlled to be at the center of the rotary axis. Therefore, the eccentricity will induce vibration as the rotary speed is high. Such vibration will deteriorate the performance of the device, reduce lifetime, destroy the structure and induce noise so as to cause some troubles to the users. Therefore, a vibration balance device is designed, in that a rotation device is added to the rotary body. As the rotation device rotates, the roller can roll to a balance position for balancing the eccentricity so as to reduce the vibration. While the surface friction, material and precise of the rotation device all affect the balance of the roller.

The prior art vibration balance device mainly includes rollers (for balancing eccentricity), roller carrier (carrying the roller and provides a predetermined operation direction). The surfaces of the rollers and the roller carrier must be very smooth so as to reduce the relative friction. While the material properties (such as hardness), roughness, precise of the roller carrier have a close relation to the balance. In general, in mass production, the roller carrier is made by plastic injection molding or cutting from metal followed by a polishing process. Although the injection molding has a cost, but the hardness and precise in dimensions are worse than those from cutting followed with a polishing process. But the cutting process needs a higher cost and much work time.

Therefore, there is an eager demand for a novel method for manufacturing the roller carrier of a vibration balance device, by which, the defect can be improved.

SUMMARY OF THE INVENTION

Accordingly, the primary object of the present invention is to provide a method for manufacturing the roller carrier of a vibration balance device. The roller carrier according to the present invention uses less materials, can be mass-produced, has a precise dimension, is light weighted, has a smooth surface and has a high surface hardness. In other word, the roller carrier made from the manufacturing process of ceramic powder metallurgy not only has preferred physical properties, such as good hardness, smoothness and precision, but also can reduce the vibration from the eccentricity of rotation. Moreover, the manufacturing cost can be reduced greatly and yield is increased. Therefore, the present invention is economical.

Another object of the present invention is to provide a method for manufacturing the roller carrier of a vibration balance device, the roller carrier is installed with at least one round track around a rotary axis thereof for carrying a plurality of rollers; characterized in that: the roller carrier is made of ceramic powder and made by a process of ceramic powder metallurgy. The material of the powder is A92A aluminum oxide or zirconium oxide, or other proper metal oxide. The manufacturing process of the ceramic powder metallurgy includes the steps of: feeding material, compacting, sintering, and polishing, or other manufacturing process of the ceramic powder metallurgy (ceramic injection molding, CIM) can be used, which includes the steps of feeding material, pelletizing, injection molding, debinding, sintering, and polishing. The various objects and advantages of the present invention will be more readily understood from the following detailed description when reading in conjunction with the appended drawing.

DETAILED DESCRIPTION OF THE PREFERRED EMBODIMENTS

Figure 1:
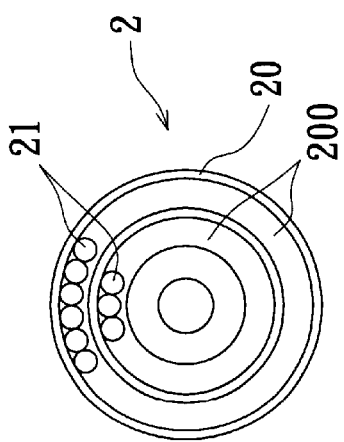
FIG. 1 is a schematic cross sectional view showing one embodiment that the roller carrier of the present invention is used to an optic disk rotation device.
Figure 2:
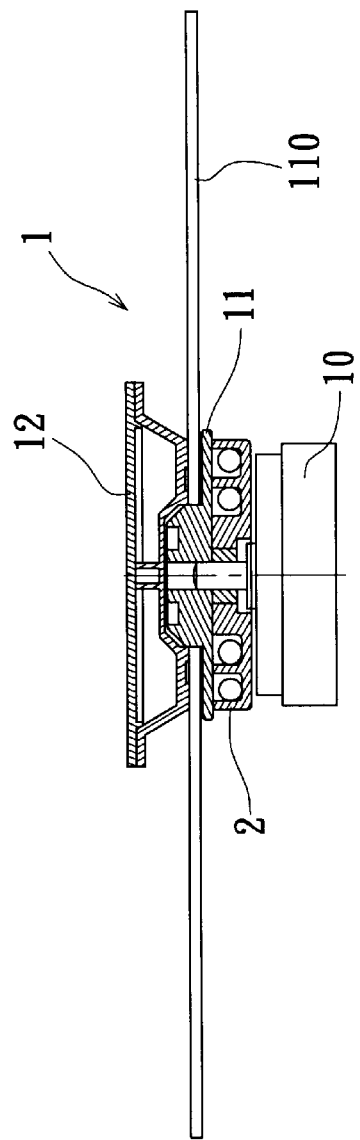
FIG. 2 is an upper cross sectional view of the roller carrier according to the present invention.
Figure 4:
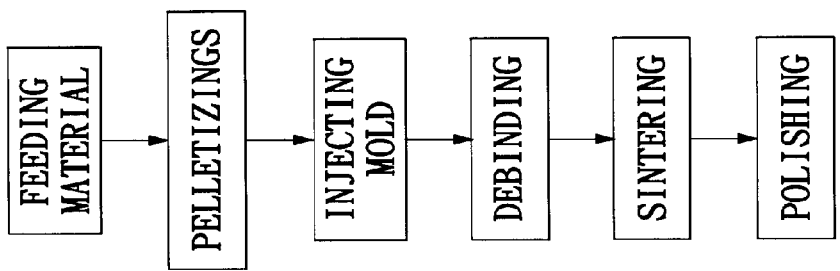
FIG. 4 is a simplified flow diagram showing another embodiment that the manufacturing process of the ceramic powder metallurgy (CIM) for manufacturing a roller carrier in the present invention.

Embodiments about the vibration balance device used in the method for manufacturing the roller carrier of a vibration balance device of the present invention is illustrated FIGS. 1 and 2. The roller carrier of the present invention is employed in the high speed rotation device 1 of an optic compact disk drive. Basically, the rotation device 1 of the optic compact disk drive includes a spindle motor 10, an optic compact disk carrier 11 driven by the spindle motor and capable of carrying optic compact disks 110, and an optic compact disk clamping device 12. The spindle motor or the optic compact disk clamping device can be installed with a vibration balance device 2, as shown in FIG. 2. The vibration balance device 2 includes a roller carrier 20 and a plurality of rollers 21. At least one round track 200 around the rotary axis thereof is installed on the roller carrier 20 for receiving rollers 21 so that as the rotation device 1 rotates in a high speed, the rollers 21 may move freely to a balance condition so as to reduce the vibration and thus, the stability of the optic compact disk 110 is improved.

In the present invention, ceramic powder is used as material and a manufacturing process of ceramic powder metallurgy is used to manufacture the aforesaid roller carrier 20.

In practical, the preferable ceramic powder is metal oxide mixture of A92A aluminum oxide. The components includes 88.45% $Al_2O_3$, 5.09% $SiO_2$, 0.084 $Fe_2O_3$, 0.62% CaO, 1.02% MgO, 0.24% $Na_2O$, 0.01% $K_2O$, and others. Besides, in the ceramic powder, $Zr_2O$ can be used as a primary component, or other proper metal oxide mixture can be used as a primary material.

Figure 3:
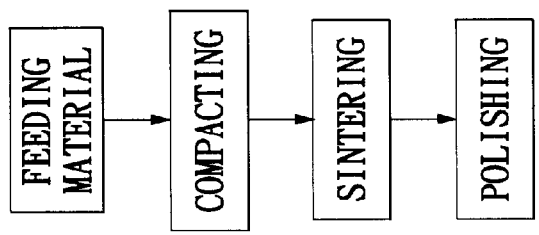
FIG. 3 is a simplified flow diagram showing one embodiment that the manufacturing process of the ceramic powder metallurgy for manufacturing a roller carrier in the present invention.

The preferable manufacturing process for the method for manufacturing the roller carrier 20 in the present invention comprises the steps of (1) general manufacturing process of ceramic powder metallurgy and (2) manufacturing process of ceramic injection molding (CIM). These two methods will be described in the following:

(1) Manufacturing process of general ceramic powder metallurgy: as shown in FIG. 3, this process comprises the steps of
  (a) Feeding material: using the aforesaid A92A aluminum oxide, $Zr_2O$ or other proper metal oxide mixture as material;
  (b) Compacting: putting the aforesaid material into a mold and a 40 tons of compacting machine serves to punch the material;
  (c) Sintering: sintering the original compacting object from previous step under a condition of 1550° C./3 hr, so that the pellets of the powder are combined in liquid phase or solid phase;
  (d) Polishing: an advanced supersonic diamond glue polishing process is used to perform a surface process for improving the smoothness.

Then, the product is washed, and thus, a very smooth roller carrier 20 is derived.

(2) Ceramic injection molding(CIM)
  (a) Feeding material: identical the aforesaid step, using the aforesaid A92A aluminum oxide, $Zr_2O$ or other proper metal oxide mixture as material;
  (b) Pelletizing: adding polypropylenes PP, or polystyrenes, or other high polymers material to the aforesaid ceramic powder, then turning or pressure-atomizing the powder for uniformly mixing the powder in the high polymers materials, and then cutting the mixture into small pellets;
  (c) Injection molding: injecting the aforesaid pellets into a mold for compacting;
  (d) Debinding: heating in a condition of 450° C./1 hr so as to gasify the binder and other high polymers materials and then removing these material;
  (e) Sintering: sintering the original compacting object from previous step under a condition of 1500~1600° C./3 hr, so that the pellets of the powder are combined in liquid phase or solid phase;
  (f) Polishing: an advanced supersonic diamond glue polishing process is used.

Similarly, the product is washed to acquire a high smooth and hardness roller carrier 20 with various shapes.

The roller carrier 20 from aforementioned processes uses less materials (with respect to the prior art cutting method), can be mass-produced (by mold), has a better dimension, has a smooth surface and has a high surface hardness (property of ceramics). In other word, the roller carrier made from the manufacturing process of ceramic powder metallurgy not only has preferred physical properties, such as good hardness, smoothness and precision, but also can reduce the vibration from the eccentricity of rotation. Moreover, the manufacturing cost can be reduced greatly and yield is increased. Therefore, the present invention is economical.

In summary, from aforesaid description, it is apparent that method for manufacturing the roller carrier of a vibration balance device according to the present invention substantially resolves many defects in the prior art, such as the defects from the conventional injection molding and cutting followed by a polishing process.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for manufacturing a roller carrier of a vibration balance device, the roller carrier being installed with at least one round track around a rotary axis thereof for carrying a plurality of rollers; characterized in that: the roller carrier is made of ceramic powder of metal compound and made by a process of ceramic powder metallurgy.

2. The method for manufacturing a roller carrier of a vibration balance device as claimed in claim 1, wherein the ceramic powder in the manufacturing process of the roller carrier is mixture of aluminum oxide $Al_2O_3$.

3. The method for manufacturing a roller carrier of a vibration balance device as claimed in claim 2, wherein the material of the mixture of aluminum oxide is A92A aluminum oxide.

4. The method for manufacturing a roller carrier of a vibration balance device as claimed in claim 1, wherein the manufacturing process of the ceramic powder metallurgy comprises the steps of:
  (a) feeding material;
  (b) compacting: putting the material from step (a) into a mold and then applying a high pressure;
  (c) sintering: heating the product in step (b) so that the pellets of the powder are combined in solid phase or liquid phase;
  (d) polishing.

5. The method for manufacturing a roller carrier of a vibration balance device as claimed in claim 4, wherein in step (c), the sintering step is performed under a condition of 1550° C./3 hr.

6. The method for manufacturing a roller carrier of a vibration balance device as claimed in claim 4, wherein in the polishing step (d), a supersonic diamond glue polish process is performed.

7. The method for manufacturing a roller carrier of a vibration balance device as claimed in claim 1, wherein the manufacturing process of the ceramic powder metallurgy comprising the steps of:
  (a) feeding material;
  (b) pelletizing: adding a high molecular weight polymer material to the powder acquired from step (a) and then uniformly mixing these material and then cutting into many small pellets;
  (c) injection molding: injecting the pellets from step (b) in a mold;
  (d) debinding: gasifying the high molecule material in the product from step (c) by heating;
  (e) sintering: heating the product in step (d) so that the pellets of the powder are combined with each other in liquid phase or solid phase;
  (f) polishing.

8. The method for manufacturing a roller carrier of a vibration balance device as claimed in claim 7, wherein in step (d), the debinding condition is 450° C./1 hr.

9. The method for manufacturing a roller carrier of a vibration balance device as claimed in claim 7, wherein the sintering condition in step (e) is 1500~1600° C./3 hr.

10. The method for manufacturing a roller carrier of a vibration balance device as claimed in claim 7, wherein in the polishing step (f), a supersonic diamond glue polish process is performed.

* * * * *